United States Patent
Takatsu et al.

(10) Patent No.: US 7,776,785 B2
(45) Date of Patent: Aug. 17, 2010

(54) CATALYST FOR CARBON MONOXIDE CONVERSION AND METHOD OF CARBON MONOXIDE MODIFICATION WITH THE SAME

(75) Inventors: Kozo Takatsu, Chiba (JP); Yoshimi Kawashima, Chiba (JP); Satoshi Nakai, Chiba (JP); Takashi Umeki, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

(21) Appl. No.: 12/445,389

(22) PCT Filed: Oct. 10, 2007

(86) PCT No.: PCT/JP2007/069752
§ 371 (c)(1),
(2), (4) Date: Apr. 13, 2009

(87) PCT Pub. No.: WO2008/044707
PCT Pub. Date: Apr. 17, 2008

(65) Prior Publication Data
US 2010/0015023 A1    Jan. 21, 2010

(30) Foreign Application Priority Data
Oct. 13, 2006  (JP) .............. 2006-280188

(51) Int. Cl.
*B01J 23/06* (2006.01)
(52) U.S. Cl. .................. 502/343; 502/345
(58) Field of Classification Search ........... 502/343, 502/345
See application file for complete search history.

(56) References Cited

U.S. PATENT DOCUMENTS

| 4,835,132 | A | 5/1989 | Sambrook |
| 6,627,572 | B1 | 9/2003 | Cai et al. |
| 6,693,057 | B1 | 2/2004 | Cai et al. |
| 7,064,097 | B1* | 6/2006 | Cai et al. ............ 502/342 |
| 2003/0191200 | A1* | 10/2003 | Yao et al. ............ 518/718 |
| 2005/0173297 | A1* | 8/2005 | Toida ............ 208/14 |

FOREIGN PATENT DOCUMENTS

| JP | 62 210057 | 9/1987 |
| JP | 2001 246258 | 9/2001 |
| JP | 2003 236382 | 8/2003 |
| JP | 2003 275590 | 9/2003 |
| JP | 2004 9011 | 1/2004 |
| JP | 2004 1220563 | 4/2004 |
| JP | 2004 202310 | 7/2004 |
| JP | 2005 066516 | 3/2005 |
| JP | 2005 520689 | 7/2005 |

* cited by examiner

*Primary Examiner*—Timothy C Vanoy
*Assistant Examiner*—Michelle Hou
(74) *Attorney, Agent, or Firm*—Oblon, Spivak, McClelland, Maier & Neustadt, L.L.P.

(57) ABSTRACT

The invention provides a catalyst for carbon monoxide conversion, comprising from 10 to 90% by mass of a copper oxide ingredient, from 5 to 50% by mass of a zinc oxide ingredient and from 10 to 50% by mass of an aluminum oxide ingredient, and having a specific surface area of from 100 to 300 m$^2$/g, a carbon monoxide adsorption of from 20 to 80 µmol/g, and a copper oxide crystallite diameter of at most 200 angstroms, as a catalyst suitable for carbon monoxide conversion for fully reducing carbon monoxide in the hydrogen gas obtained through reforming of a starting hydrocarbon material, for the purpose of enabling stable long-term operation of a fuel cell which uses hydrogen gas as a fuel and which is frequently and repeatedly started and stopped.

12 Claims, 2 Drawing Sheets

CATALYST FOR CARBON MONOXIDE CONVERSION AND METHOD OF CARBON MONOXIDE MODIFICATION WITH THE SAME

TECHNICAL FIELD

The present invention relates to a catalyst for carbon monoxide conversion and to a method of carbon monoxide modification using it, in particular to a catalyst for hydrogen production and to a catalyst for carbon monoxide conversion for fuel cells (hereinafter carbon monoxide may be expressed as CO).

BACKGROUND ART

Recently, new energy technology has become highlighted owing to environmental problems, and as one of the new energy technology, a fuel cell has been specifically noted. The fuel cell converts chemical energy to electric energy through electrochemical reaction of hydrogen and oxygen, attaining high energy utilization efficiency. Therefore, extensive studies have been carried out on realization of fuel cells for civil use, industrial use, automobile use, etc.

As categorized in accordance with the type of the electrolyte employed therein, fuel cells are known to include phosphate-type, molten carbonate-type, solid oxide-type and solid polymer-type ones and others. With regard to the hydrogen sources for producing hydrogen for these fuel cells, studies have been conducted on liquefied natural gas predominantly containing methane; city gas predominantly containing natural gas; synthetic liquid fuels produced from natural gas; petroleum-derived liquefied petroleum gas; and petroleum-derived hydrocarbons such as naphtha and kerosene. For producing hydrogen from these gaseous or liquid hydrocarbons, in general, the hydrocarbons are, after processed for desulfurization, reformed in a mode of partial oxidation reforming, autothermal reforming, steam reforming or the like in the presence of a reforming catalyst.

The above reformation treatment gives mainly hydrogen and carbon monoxide, of which carbon monoxide may be converted into hydrogen and carbon dioxide through aqueous gas shift reaction with water. The aqueous gas shift reaction is utilized also for changing the ratio of hydrogen and carbon monoxide in the aqueous gas to a desired one in accordance with the object of the production reaction, and it is also applicable to hydrogen production. The copper-zinc-aluminum catalyst for use in the aqueous gas shift reaction is active at a relatively low temperature, as compared with a noble metal-based catalyst, and, therefore, the carbon monoxide concentration may be lowered to a low concentration of at most 1%, which, however, is problematic in that the catalyst may be inactivated owing to copper sintering to occur under heat and steam. Accordingly, the catalyst may be used for a long period of time in an industrial plant that is driven under a constant condition, but in case where stop and start are frequently repeated and the catalyst is repeatedly exposed to oxidation/reduction atmospheres like in a fuel cell, copper sintering may readily occur and the catalyst may be thereby readily inactivated. A catalyst with a noble metal such as platinum supported by titania or ceria has high durability, but its activity at low temperatures is not comparable to that of the copper-zinc-aluminum catalyst.

In that situation, for improving the activity and the durability of the copper-zinc-aluminum catalyst, various investigations have been made, and the following reports have been given.

Alumina or an alumina precursor is previously introduced into a reaction system, and copper and zinc are deposited around the alumina or alumina precursor serving as a nucleus; and the catalyst thus produced has excellent activity and durability (Patent Reference 1). A catalyst comprising, as the indispensable ingredients, copper oxide, zinc oxide and aluminum oxide, and in addition to these, a specific amount of zirconium oxide and manganese oxide has high activity (Patent Reference 2). A catalyst produced from a catalyst precursor that contains both aluminium having a morphology of hydrotalcite and aluminum other than hydrotalcite is highly active (Patent Reference 3). A catalyst with copper supported by a zinc aluminum composite oxide carrier can keep high activity even when exposed to oxygen gas at high temperatures (Patent Reference 4).

There are given various proposals for improved methods as in the above, but for use for fuel cells that are frequently started and stopped, they are not still on a satisfactory durability level.

Patent Reference 1: JP-A 2003-236382
Patent Reference 2: JP-A 2004-122063
Patent Reference 3: JP-T 2005-520689
Patent Reference 4: JP-A 2003-275590

DISCLOSURE OF THE INVENTION

Problems that the Invention is to Solve

Accordingly, an object of the present invention is to provide a catalyst for carbon monoxide conversion which can be used for a long period of time with little reduction in its activity even when applied to fuel cells that are frequently started and stopped. Other problems and technical features of the present invention will be further clarified by the following description.

Means for Solving the Problems

The present inventors have repeatedly studied for the purpose of solving the above-mentioned problems and, as a result, have found that a copper-zinc-aluminum having the composition mentioned below and produced according to the production method mentioned below is excellent both in the activity and the durability.

Specifically, the catalyst for carbon monoxide conversion of the present invention comprises from 10 to 90% by mass of a copper oxide ingredient, from 5 to 50% by mass of a zinc oxide ingredient and from 10 to 50% by mass of an aluminum oxide ingredient, and has a specific surface area of from 100 to 300 $m^2/g$, a carbon monoxide adsorption of from 20 to 80 $\mu mol/g$, and a copper oxide crystallite diameter of at most 200 angstroms.

The catalyst for carbon monoxide conversion of the present invention may be produced by washing, drying and calcining a precipitate formed by mixing a solution that contains a copper salt, a zinc salt and an aluminum salt and a solution that contains sodium hydroxide.

In the carbon monoxide modification method of the present invention, the carbon monoxide concentration in a hydrogen-containing gas that contains carbon monoxide is reduced through aqueous gas shift reaction at 150 to 300° C. using the above-mentioned catalyst.

The fuel cell system of the present invention comprises the hydrogen obtained according to the above-mentioned carbon monoxide modification method.

EFFECT OF THE INVENTION

The method of the present invention is a method for producing a copper-zinc-aluminum catalyst having a specific composition through precipitation at a specific pH using sodium hydroxide as a precipitating agent. The catalyst of the present invention is excellent both in the activity and the durability; and when fitted in a fuel cell reformer as a catalyst for carbon monoxide conversion, its activity is lowered little even in repeated start and stop cycles and it can be used for a long period of time.

DESCRIPTION OF REFERENCE NUMERALS

Figure 1:
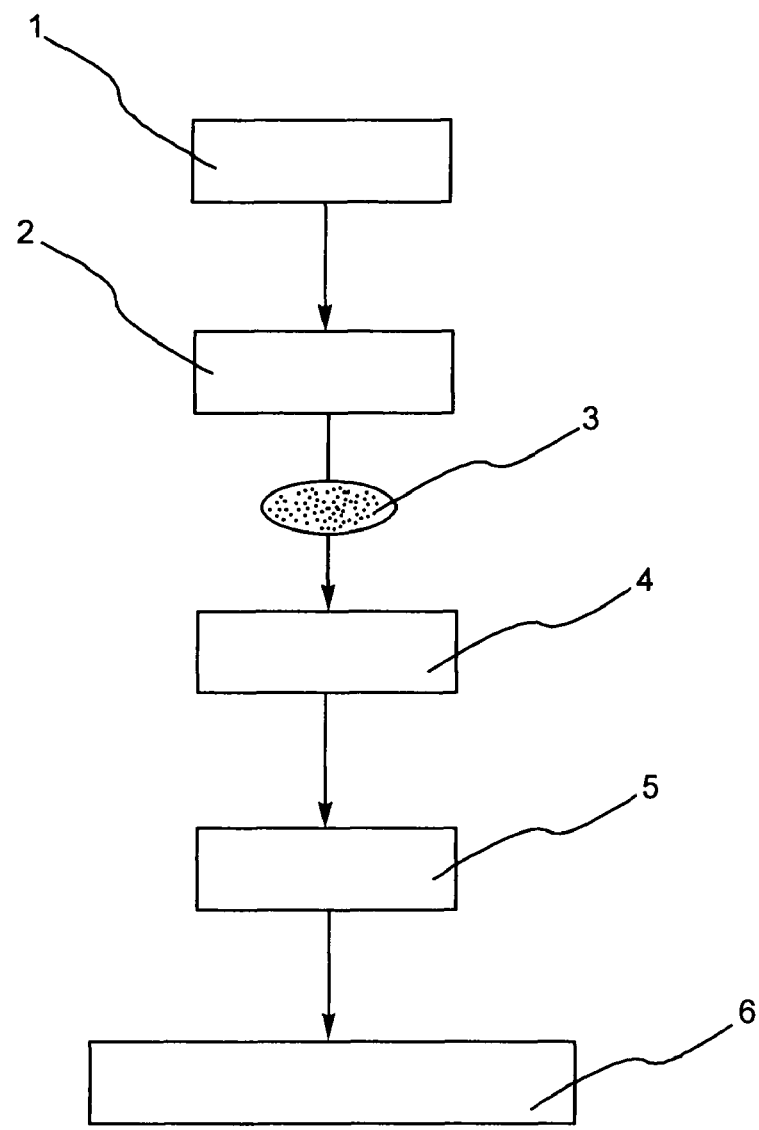
FIG. 1 It is an outline view showing one embodiment of a hydrogen producing system for fuel cells of the present invention.

1 Fuel for Hydrogen Production
2 Desulfurizer
3 Sulfur Detector
4 Reformer
5 Modifier
6 Fuel Cell Stack

BEST MODE FOR CARRYING OUT THE INVENTION

The catalyst composition of the copper-zinc-aluminium-based catalyst for carbon monoxide conversion of the present invention comprises from 10 to 90% by mass, preferably from 30 to 80% by mass of a copper oxide ingredient, from 5 to 50% by mass, preferably from 5 to 40% by mass of a zinc oxide ingredient and from 10 to 50% by mass, preferably from 15 to 40% by mass of an aluminum oxide ingredient. One characteristic feature of the catalyst is that, as compared with a catalyst heretofore considered the best, its zinc oxide ingredient is small and its aluminum oxide ingredient is large.

In the above-mentioned catalyst composition, when the copper oxide ingredient oversteps the range of from 10 to 90% by mass, then the quantity of the copper atom as the active species is small and the catalyst activity may lower, and since the quantity of the zinc atom and the aluminum atom is relatively small, the durability of the catalyst (especially when the catalyst is used in repeated start and stop cycles, the time for which the catalyst can maintain its activity on a satisfactory level; and this may be hereinafter referred to as durability) may lower.

In the above-mentioned catalyst composition, when the zinc oxide ingredient oversteps the range of from 5 to 50% by mass, then the quantity of the zinc atom is small and the catalyst durability may lower, and since the quantity of the copper atom is relatively small, the catalyst activity may lower.

In the above-mentioned catalyst composition, when the aluminum oxide ingredient oversteps the range of from 10 to 50% by mass, then the catalyst strength may lower and the catalyst durability may lower. In addition, since the quantity of the copper atom is small, the catalyst activity may lower.

More preferably, the zinc oxide ingredient of the catalyst composition does not contain zincite. Not containing zincite, both the durability and the activity of the catalyst for carbon monoxide conversion of the present invention are further more enhanced; and when the catalyst is fitted in a fuel cell reformer as a carbon monoxide conversion (shift) catalyst, it exhibits the advantage in that its activity is lowered little even in repeated start and stop cycles and it can be used for a long period of time.

Regarding the physical properties thereof, the copper-zinc-aluminum-based catalyst for carbon monoxide conversion of the present invention has a specific surface area of from 100 to 300 $m^2/g$, preferably from 120 to 200 $m^2/g$, a carbon monoxide adsorption of from 20 to 80 $\mu mol/g$, preferably from 30 to 70 $\mu mol/g$, and a copper oxide crystallite diameter of at most 200 angstroms, preferably at most 150 angstroms.

Preferably, the zinc oxide ingredient exists at least as zinc-aluminum spinel ($ZnAl_2O_4$). Finer crystals of zinc-aluminum spinel are more effective for preventing copper sintering; and the crystallite diameter is preferably at most 100 angstroms, especially preferably at most 50 angstroms.

The presence of zincite and zinc-aluminum spinel may be confirmed on diffraction patterns through powdery X-ray diffractiometry.

The X-ray diffractiometric pattern of zincite gives diffraction lines on the following sites:
d=2.475, d=2.814, d=2.602, d=1.625, d=1.477, d=1.378.

The X-ray diffractiometric pattern of zinc-aluminum spinel ($ZnAl_2O_4$) gives diffraction lines on the following sites:
d=2.442, d=2.863, d=1.432, d=1.559, d=1.653, d=1.281.

When zinc-aluminum spinel exists near the copper atom, it is effective for preventing copper oxide or reduced copper under heat and steam or in a condition where the catalyst is repeatedly oxidized and reduced from being sintered to lose its activity; and even under heat and steam or in a condition of repeated oxidation/reduction atmospheres, copper may exist stably and may be prevented from being sintered, therefore exhibiting stable catalyst activity. On the other hand, when the zinc oxide ingredient is zincite, it has been known that the zincite particles themselves are sintered in the above-mentioned repeated oxidation/reduction and promote copper sintering.

When the specific surface area oversteps the range of from 100 to 300 $m^2/g$, then the catalyst activity lowers and the effect of preventing copper sintering lowers.

The carbon monoxide adsorption depends on the amount of the copper active points effective to reaction, and is preferably within a range of from 20 to 80 $\mu mol/g$ from the viewpoint of the activity and the durability. When the adsorption is too large, the durability may rather lower.

When the copper oxide crystallite diameter is more than 200 angstroms, then the number of the copper active points effective to reaction decreases and the activity therefore decreases.

When the zinc-aluminum spinel crystallite diameter is more than 100 angstroms, then it is unfavorable from the viewpoint of the durability since the effect of inhibiting copper sintering lowers.

In the copper-zinc-aluminum-based catalyst for carbon monoxide conversion of the present invention, preferably, the atomic ratio of copper/zinc is at least 1.0, and the atomic ratio of zinc to aluminum (Zn/Al) is from 0.1 to 1.5. More preferably, the atomic ratio of copper/zinc is from 2 to 10, and the atomic ratio of zinc to aluminum (Zn/Al) is from 0.2 to 1.0.

When the atomic ratio of copper/zinc is less than 1.0, then the activity is insufficient.

When the atomic ratio of zinc to aluminum (Zn/Al) oversteps the range of from 0.1 to 1.5, then zinc-aluminum spinel could not be formed after calcining, or even though formed, its amount is insufficient, whereby the durability of the catalyst (especially when the catalyst is used in repeated start and stop cycles, the time for which the catalyst can maintain its activity on a satisfactory level) may lower or shorten, and since the amount of the zinc atom is too large, zincite or the like may be thereby formed with the result that the durability of the catalyst could not be enhanced as expected.

The copper-zinc-aluminum catalyst for carbon monoxide conversion of the present invention may be obtained by washing, drying and calcining a precipitate formed by mixing a solution that contains a copper salt, a zinc salt and an aluminum salt and a solution that contains sodium hydroxide in such a manner that the pH of the system could be from 7 to 11.5.

For producing the catalyst for carbon monoxide conversion of the present invention, a solution that contains a copper salt, a zinc salt and an aluminum salt and a solution that contains sodium hydroxide are mixed for coprecipitation of copper, zinc and aluminum, for which any one of the two is kept stirred and the other one may be mixed with it. In this case, the two are so mixed that the pH of the mixture after the mixing may be from 7 to 11.5, preferably from 8.5 to 11.0.

In producing the catalyst for carbon monoxide conversion of the present invention, the solution containing a copper salt, a zinc salt and an aluminum salt and the solution containing sodium hydroxide may be simultaneously fed via a pump and mixed. In this case, the mixing is so attained that the pH of the mixture may be from 7 to 11.5, preferably from 8.5 to 11.0. When the pH of the mixture is kept falling within a range of from 7 to 11.5, then a catalyst having sufficient activity and durability can be obtained.

In mixing the solutions, the temperature is kept falling within a range of from about 0° C. to about 90° C., preferably from about 10° C. to about 80° C. with stirring.

As so described in the above, sodium hydroxide is used as a precipitating agent for the catalyst for carbon monoxide conversion of the present invention. In many cases of prior arts, sodium carbonate is said to be preferred as a precipitating agent. In a high-ZnO, low-$Al_2O_3$ composition region heretofore considered the best, the activity of the catalyst for which sodium carbonate is used is surely excellent; however, in a low-ZnO, high-$Al_2O_3$ composition region, the capability of the catalyst produced by the use of sodium carbonate is not excellent, but it has been clarified that, in the low-ZnO, high-$Al_2O_3$ composition region, use of sodium hydroxide as a precipitating agent realizes the formation of fine crystals of aluminum oxide spinel, therefore producing a catalyst excellent in the activity and the durability and bringing about the present invention.

In the present invention, as the salt species of copper and zinc, usable are nitrates, chlorides, sulfates, acetates, citrates, etc. Of those, preferred are nitrates. As the aluminum salt, usable are nitrate, chloride, sulfate, hydroxide, sodium aluminate, pseudoboehmite, etc. Preferred are nitrate and sodium aluminate.

In the present invention, the precipitate may be washed and filtered immediately after its formation, or may be washed and filtered after ripened.

In the present invention, the drying condition is not specifically defined. At a temperature of from room temperature to 200° C., the precipitate may be completely dried. The calcining condition is not also specifically defined. It may be calcined at 150 to 500° C. or so.

In the carbon monoxide modification method of the present invention, the carbon monoxide concentration in a hydrogen-containing gas that contains carbon monoxide is lowered through aqueous gas shift reaction using the above-mentioned catalyst at 150 to 300° C.

In the fuel cell system of the present invention, hydrogen obtained by reforming a hydrocarbon fuel is used, and the carbon monoxide concentration in the reformed product is lowered and is simultaneously converted into hydrogen according to the above-mentioned carbon monoxide modification method. For the starting hydrocarbon fuel for the fuel cell system of the invention, usable is any of LPG, city gas, natural gas, naphtha, kerosene and light oil.

The system of the present invention is described in more detail hereinunder, with reference to the drawings attached hereto. FIG. 1 is an outline view showing one embodiment of the system of the present invention.

In FIG. 1, the hydrocarbon fuel 1 for hydrogen production in a container is first desulfurized for sulfur-containing compound removal in the desulfurizer 2. Next, the fuel is introduced into the reformer 4 and reformed therein to produce hydrogen. Between the desulfurizer 2 and the reformer 4, the sulfur detector 3 may be disposed. Further, the fuel taken out of the reformer 4 is introduced into the modifier 5 filled with the catalyst of the present invention, in which the carbon monoxide concentration in the fuel is lowered, and thereafter the fuel is introduced into the fuel cell stack 6 and is utilized for power generation therein.

The sulfur detector may be a device of any type capable of monitoring a minor sulfur concentration; and in general, typical methods for it include a UV fluorescence method (JIS K2541-6), a lead acetate paper test method, a coulometric titration method, etc. Any of these is favorably employed as capable of detecting and monitoring extremely minor sulfur on a level of 0.2 ppm by mass or so with high accuracy.

Any one heretofore used in the art can be favorably used as the desulfurizer for use in the hydrogen production system for fuel cells of the present invention. The desulfurizing agent for use in the desulfurizer is not specifically defined, and any one heretofore known or used in the art as a desulfurizer, for example, activated carbon, zeolite, metal-based adsorbents and others are favorably usable herein. One or more such desulfurizers may be used either singly or as combined. Regarding the desulfurizing condition, in general, the temperature is selected within a range of from 0 to 300° C., the gas hourly space velocity (GHSV) is within a range of from 200 to 60,000 $h^{-1}$, preferably from 200 to 4,000 $h^{-1}$, and the liquid hourly space velocity is within a range of from 0.1 to 10 $h^{-1}$, preferably within a range of from 0.1 to 1.0 $h^{-1}$.

As the reformer, for example, usable is any of partial oxidation reformers, autothermal reformers, steam reformers and others; and a catalyst of partial oxidation reforming catalysts, autothermal reforming catalysts, steam reforming catalysts and others applicable to them is employed for hydrogen conversion. In this reforming treatment, the concentration of the sulfur compound in the desulfurized hydrocarbon fuel is especially preferably at most 0.05 ppm by mass, more preferably at most 0.01 ppm by mass, from the viewpoint of the life of the reforming catalyst. The above-mentioned partial oxidation reforming is a method for producing hydrogen through partial oxidation of hydrocarbon, in which the reforming reaction is attained in the presence of a partial oxidation reforming catalyst generally under a reaction pressure of from normal pressure to 5 MPa, at a reaction temperature of from 400 to 1,100° C., at GHSV of from 1,000 to 100,000 $h^{-1}$, and at a ratio of oxygen ($O_2$)/carbon of from 0.2 to 0.8. Further, the autothermal reforming is a method of a combination of partial oxidation reforming and steam reforming, in which the reforming reaction is attained in the presence of an autothermal reforming catalyst generally under a reaction pressure of from normal pressure to 5 MPa, at a reaction temperature of from 400 to 1,100° C., at a ratio of oxygen ($O_2$)/carbon of from 0.1 to 1, at a ratio of steam/carbon of from 0.1 to 10, and at GHSV of from 1,000 to 100,000 h$^{-1}$. The steam reforming is a method for producing hydrogen through contact of hydrocarbon with steam, in which the reforming reaction is attained in the presence of a steam reforming catalyst generally under a reaction pressure of from normal pressure to 3 MPa, at a reaction temperature of from 200 to 900° C., at a ratio of steam/carbon of from 1.5 to 10, and at GHSV of from 1,000 to 100,000 h$^{-1}$.

In the present invention, the above-mentioned partial oxidation reforming catalyst, autothermal reforming catalyst and steam reforming catalyst may be suitably selected from conventional known catalysts and used. In particular, ruthenium-based and nickel-based catalysts are preferably used. The carrier for these catalysts includes, for example, manganese oxide, cerium oxide and zirconium oxide. One or more of these carriers may be used either singly or as combined. The carrier may be formed of such a metal oxide alone, or may comprise the metal oxide combined with any other fireproof porous inorganic oxide such as alumina.

The system of the present invention includes a fuel cell system comprising a reformer and a fuel cell that consumes the hydrogen gas produced by the reformer, as a fuel, in which a fuel desulfurized in a desulfurizer is mixed with water fed from a water tank via a water pump, then mixed with air fed through an air blower, and introduced into the reformer. The reformer is filled with the above-mentioned reforming catalyst, and hydrogen is produced from the hydrocarbon fuel (e.g., a mixed vapor that contains a liquefied petroleum gas-derived gas, steam and oxygen) introduced into the reformer according to any of the above-mentioned reforming reaction.

The hydrogen gas thus produced is introduced into the CO modifier filled with a catalyst of the present invention, in which the CO concentration is reduced to such a degree that it may not have any influence on the characteristics of the fuel cell. If desired, a CO selective oxidizer may be provided before the gas is introduced into the fuel cell. The CO selective oxidation catalyst includes ruthenium-based catalysts, platinum-based catalysts, their mixed catalysts, etc.

In the fuel cell system of the present invention, a burner for the reformer may be connected to the side of the negative electrode and the remaining hydrogen may be used as a fuel. On the other hand, a vapor-water separator may be connected to the side of the positive electrode, in which water formed through bonding of oxygen in air and hydrogen fed to the side of the positive electrode and the exhaust gas may be separated from each other, and water may be utilized for formation of steam. In a fuel cell, heat is generated along with power generation, and an exhaust heat recovering device may be attached to it and the heat may be recovered and utilized effectively. The exhaust heat recovering device may comprise a heat exchanger attached to the fuel cell to take the heat generated during the reaction, a heat exchanger for heat-exchanging the heat taken by that heat exchanger for water, a condenser, and a pump for circulating a coolant through the heat exchangers and the condenser; and the hot water recovered in the heat exchanger may be effectively utilized in other plants, etc.

EXAMPLES

Example 1

Copper nitrate 3-hydrate (94.4 g), zinc nitrate 6-hydrate (37.4 g) and aluminum nitrate 9-hydrate (110.0 g) were put into water (1 L) to prepare a solution (A). A 2 N solution of sodium hydroxide was prepared. The solution (A) and the sodium hydroxide solution were simultaneously introduced dropwise into a container filled with water (300 mL) at 55° C. During the introduction, the precipitate was stirred and kept at 55° C., and the dropping speed of the sodium hydroxide solution was controlled so that the pH of the precipitate could be from 9.0 to 9.5. The precipitate was collected by filtration, and fully washed with water. Thus collected, the precipitate was dried at 120° C., and then calcined at 350° C. for 3 hours to give a catalyst. The composition of the catalyst was: 55.3% by mass of copper oxide, 19.2% by mass of zinc oxide and 25.4% by mass of aluminum oxide. The catalyst was shaped under compression, ground and formed into particles of from 0.5 to 1 mm in size.

Example 2

A catalyst was prepared in the same manner as in Example 1, for which, however, the pH of the precipitate was kept to be from 11 to 11.5. The composition of the catalyst was: 62.9% by mass of copper oxide, 21.3% by mass of zinc oxide and 15.7% by mass of aluminum oxide.

Example 3

A catalyst was prepared in the same manner as in Example 1, for which, however, the pH of the precipitate was kept to be from 10 to 10.5. The composition of the catalyst was: 58.8% by mass of copper oxide, 21.0% by mass of zinc oxide and 20.2% by mass of aluminum oxide.

Example 4

A catalyst was prepared in the same manner as in Example 1, for which, however, copper nitrate 3-hydrate (95.1 g), zinc nitrate 6-hydrate (54.8 g) and aluminum nitrate 9-hydrate (73.6 g) were used, and the pH of the precipitate was kept to be from 10 to 10.5. The composition of the catalyst was: 56.1% by mass of copper oxide, 29.1% by mass of zinc oxide and 15.0% by mass of aluminum oxide.

Example 5

A catalyst was prepared in the same manner as in Example 1, for which, however, copper nitrate 3-hydrate (95.1 g), zinc nitrate 6-hydrate (18.3 g) and aluminum nitrate 9-hydrate (147.2 g) were used, and the pH of the precipitate was kept to be from 8.5 to 9.0. The composition of the catalyst was: 55.7% by mass of copper oxide, 10.4% by mass of zinc oxide and 33.9% by mass of aluminum oxide.

Example 6

A catalyst was prepared in the same manner as in Example 1, for which, however, copper nitrate 3-hydrate (133.1 g), zinc nitrate 6-hydrate (21.9 g) and aluminum nitrate 9-hydrate (66.2 g) were used, and the pH of the precipitate was kept to be from 9.5 to 10.0. The composition of the catalyst was: 75.5% by mass of copper oxide, 11.6% by mass of zinc oxide and 12.9% by mass of aluminum oxide.

Example 7

A catalyst was prepared in the same manner as in Example 1, for which, however, copper nitrate 3-hydrate (84.5 g), zinc nitrate 6-hydrate (48.7 g) and aluminum nitrate 9-hydrate (106.3 g) were used. The composition of the catalyst was: 49.7% by mass of copper oxide, 25.5% by mass of zinc oxide and 24.8% by mass of aluminum oxide.

Example 8

A catalyst was prepared in the same manner as in Example 1, for which, however, copper nitrate 3-hydrate (57.0 g), zinc nitrate 6-hydrate (51.2 g) and aluminum nitrate 9-hydrate (154.5 g) were used. The composition of the catalyst was: 35.0% by mass of copper oxide, 27.2% by mass of zinc oxide and 37.8% by mass of aluminum oxide.

Comparative Example 1

A commercial product, copper-zinc-aluminum catalyst (Sud-Chemie's MDC-7) was ground and formed into particles of from 0.5 to 1 mm in size. Its composition was: 41.3% by mass of copper oxide, 49.0% by mass of zinc oxide and 9.7% by mass of aluminum oxide.

Comparative Example 2

A catalyst was prepared in the same manner as in Example 1, for which, however, copper nitrate 3-hydrate (69.2 g), zinc nitrate 6-hydrate (96.3 g) and aluminum nitrate 9-hydrate (40.1 g) were used, and the pH of the precipitate was kept to be from 7.5 to 8.0. The composition of the catalyst was: 42.0% by mass of copper oxide, 48.1% by mass of zinc oxide and 9.9% by mass of aluminum oxide.

Comparative Example 3

A catalyst was prepared in the same manner as in Example 1, for which, however, copper nitrate 3-hydrate (69.2 g), zinc nitrate 6-hydrate (96.3 g) and aluminum nitrate 9-hydrate (40.1 g) were used, a 2 N sodium carbonate solution was used in place of sodium hydroxide, and the pH of the precipitate was kept to be from 8.5 to 9.0. The composition of the catalyst was: 41.0% by mass of copper oxide, 49.3% by mass of zinc oxide and 9.5% by mass of aluminum oxide.

Comparative Example 4

A catalyst was prepared in the same manner as in Comparative Example 3, for which, however, the pH of the precipitate was kept to be from 6.5 to 7.5. The composition of the catalyst was: 41.4% by mass of copper oxide, 48.9% by mass of zinc oxide and 9.7% by mass of aluminum oxide.

Comparative Example 5

A catalyst was prepared in the same manner as in Example 1, for which, however, a 2 N sodium carbonate solution was used in place of sodium hydroxide, and the pH of the precipitate was kept to be from 6.0 to 7.0. The composition of the catalyst was: 56.6% by mass of copper oxide, 16.4% by mass of zinc oxide and 26.9% by mass of aluminum oxide.

Comparative Example 6

A catalyst was prepared in the same manner as in Example 1, for which, however, copper nitrate 3-hydrate (95.1 g), zinc nitrate 6-hydrate (73.1 g) and aluminum nitrate 9-hydrate (36.8 g) were used, and the pH of the precipitate was kept to be from 10.5 to 11.0. The composition of the catalyst was: 58.6% by mass of copper oxide, 38.5% by mass of zinc oxide and 2.9% by mass of aluminum oxide.

Comparative Example 7

A catalyst was prepared in the same manner as in Example 1, for which, however, copper nitrate 3-hydrate (95.1 g) and zinc nitrate 6-hydrate (91.4 g) were used, and the pH of the precipitate was kept to be from 10.5 to 11.0. The composition of the catalyst was: 54.7% by mass of copper oxide, 45.3% by mass of zinc oxide and 0.0% by mass of aluminum oxide.

Comparative Example 8

A catalyst was prepared in the same manner as in Example 1, for which, however, copper nitrate 3-hydrate (95.1 g) and aluminum nitrate 9-hydrate (184.0 g) were used, and the pH of the precipitate was kept to be from 6.0 to 7.0. The composition of the catalyst was: 54.5% by mass of copper oxide, 0.0% by mass of zinc oxide and 45.5% by mass of aluminum oxide.

Determination of Physical Properties of Catalyst:

(a) Determination of Surface Area:

For surface area determination, used was a specific surface area meter by Yuasa Ionics. A sample (about 100 mg) was filled into a sample tube, and heated and dewatered for pretreatment in a nitrogen stream atmosphere at 200° C. for 20 minutes. Next, the sample was made to adsorb nitrogen by applying thereto a mixed gas flow of nitrogen (30%)/helium (70%) at a liquid nitrogen temperature, and after nitrogen desorption from it, the nitrogen adsorption was measured with a TCD detector, and from this, the specific surface area of the sample was computed.

(b) Determination of CO Adsorption:

CO adsorption was determined according to a pulse method using a pulse adsorption meter R6015 (by Okura Riken). A sample (about 200 mg) was weighed, and reduced for pretreatment under 100% hydrogen at 200° C. for 60 minutes. Next, this was purged with He at 200° C. for 60 minutes. At 50° C., CO gas was pulsewise introduced for CO adsorption determination. CO pulse was repeated until the sample could no more adsorb CO, and the CO adsorption was determined.

(c) XRD Determination:

For XRD determination, used was Rigaku's X-ray diffractiometer. A sample was filled in a glass-made sample cell, and analyzed according to a 2θ-θ reflection method with an X-ray source of Cu—Kα (1.5406 angstroms, monochromatized with a graphite monochrometer). The crystallite diameter of CuO and $ZnAl_2O_4$ was computed according to a Scherrer equation. (The crystallite diameter of $ZnAl_2O_4$ was computed in Examples 1, 6 and 8 and Comparative Example 1.)

(d) Composition Analysis:

The amount of Cu, Zn and Al of the catalyst was determined according to a plasma emission (ICP) method. From the found data of Cu, Zn and Al, the amount of CuO, ZnO and $Al_2O_3$ was computed so that their total could be 100% by mass.

Method for Determination of Catalyst Activity:

SiC (4 mL) was added to each catalyst (0.5 cc) formed into particles of from 0.5 to 1 mm in size, and filled in a reactor tube having an inner diameter of 12 mm. In the reactor tube, the catalyst was reduced in a vapor atmosphere of $H_2/N_2=20/80$ at 230° C. for 2 hours, and then a gas of $H_2/CO/CO_2/$ $H_2O=49.9/9.9/10.2/30.0$ (vol. %) was introduced into it at GHSV of 60,000 $h^{-1}$ for carbon monoxide modification at 200° C. The resulting gas was sampled and analyzed through gas chromatography to determine the concentration thereof. From the data, the CO conversion was computed according to the following formula. The results are shown in Table 1.

CO Conversion(%)=((A−B)/A)×100.

In the above formula,

A=(CO amount on the inlet port side of the reactor)=(CO concentration before modification (vol. %))×(gas amount before modification (mL/min)), B=(CO amount on the outlet port side of the reactor)=(CO concentration after modification (vol. %))×(gas amount after modification (mL/min)).

The results of the determination of the physical properties of the catalysts and the method of evaluation of the activity of the catalysts are shown in Table 1 and Table 2.

TABLE 1

| | Surface Area $M^2/g$ | CO Adsorption mmol/g | CuO Crystallite Diameter angstrom | Conversion (%) (200° C.) |
|---|---|---|---|---|
| Example 1 | 133 | 0.034 | 106 | 25.6 |
| Example 2 | 101 | 0.028 | 85 | 21.4 |
| Example 3 | 127 | 0.052 | 63 | 26.2 |
| Example 4 | 114 | 0.032 | 104 | 16.5 |
| Example 5 | 175 | 0.044 | 108 | 31.9 |
| Example 6 | 121 | 0.026 | 73 | 45.1 |
| Example 7 | 144 | 0.034 | 98 | 26.1 |
| Example 8 | 183 | 0.022 | 60 | 28.9 |
| Comparative Example 1 | 64 | 0.026 | 72 | 22.9 |
| Comparative Example 2 | 49 | 0.008 | 210 | 13.6 |
| Comparative Example 3 | 102 | 0.069 | 32 | 13.2 |
| Comparative Example 4 | 113 | 0.050 | 65 | 7.8 |
| Comparative Example 5 | 111 | 0.023 | 96 | 5.5 |
| Comparative Example 6 | 55 | 0.016 | 98 | 10.9 |
| Comparative Example 7 | 15 | 0.002 | 228 | 4.6 |
| Comparative Example 8 | 178 | 0.023 | 395 | 7.5 |

TABLE 2

| | Surface Area $(m^2/g)$ | CO Adsorption (mmol/g) | $ZnAl_2O_4$ Crystallite Diameter (angstrom) | CuO Crystallite Diameter (angstrom) | Conversion (%) @200° C. |
|---|---|---|---|---|---|
| Example 1 | 133 | 0.034 | 28 | 106 | 22.6 |
| Example 6 | 121 | 0.026 | at most 20 | 73 | 45.1 |
| Example 8 | 183 | 0.022 | 45 | 60 | 28.9 |
| Comparative Example 1 | 64 | 0.026 | no | 72 | 22.9 |

Evaluation of Catalyst Durability:

The catalyst (3 mL) formed into particles of from 0.5 to 1 mm in size was filled in a quartz reactor tube having an inner diameter of 16 mm. In the reactor tube, the catalyst was reduced in a vapor atmosphere of $H_2/N_2=20/80$ at 230° C. for 2 hours, and then a gas of $H_2/CO/CO_2/H_2O=49.9/9.9/10.2/30.0$ (vol. %) was introduced into it at GHSV of 2,500 $h^{-1}$ for CO modification at 200° C. for 1 hour, and thereafter this was cooled to 50° C. with purging with steam. The steam was stopped, and this was kept as such for 1 hour. The reaction at 200° C. for 1 hour followed by cooling at 50° C. was repeated. From the tendency toward activity depression owing to the heat cycles, the durability of the catalyst was evaluated. The catalyst of Example 1 and the catalyst of Comparative Example 1 were tested. The CO conversion depression after heat cycle frequency is shown in Table 3.

TABLE 3

| | Catalyst | |
|---|---|---|
| Heat Cycle Frequency | Example 1 | Comparative Example 1 |
| 0 | 88.8 | 89.8 |
| 10 | 88.0 | 84.1 |
| 30 | 87.0 | 70.1 |
| 50 | 86.0 | 68.4 |

<Physical Change of Catalyst in In-Situ XRD>

The catalyst was processed according to a series of the following steps A to F. After thus processed, the catalyst was analyzed using an in-situ XRD apparatus for the compound condition and the crystallite diameter change of copper and zinc.

A: Drying ($N_2$, 100° C., 30 minutes)

B: Reduction with hydrogen (20% $H_2$/80% $N_2$, 250° C., 2 hours)

C: Steaming (30% $H_2O$/14% $H_2$/56% $N_2$, 250° C., 2 hours)

D: Cooling to room temperature ($N_2$, room temperature)

E: Steam condensation (44% $H_2O$/11% $H_2$/45% $N_2$, 70° C., 1 hour)

F: Re-reduction with hydrogen (20% $H_2$/80% $N_2$, 250° C., 1 hour)

As in Table 4, the zinc oxide ingredient of the catalysts of Examples 1, 6 and 8 does not exist as zincite but exists as $ZnAl_2O_4$. After the treatment of reduction, steaming and steam condensation, the particle size of $ZnAl_2O_4$ does not change and is stable. Copper oxide changes into copper by reduction, but its particle size changes little after the above treatment and is stable.

As opposed to this, in the catalyst of Comparative Example 1, zinc exists as zincite, and $ZnAl_2O_4$ does not exist therein. Therefore, the particle size of copper in the catalyst increases after the treatment of reduction, steaming and steam condensation. Not only that of copper but also the particle diameter of zinc increases.

TABLE 4

| | | A | B | C | D | E | F |
|---|---|---|---|---|---|---|---|
| Comparative Example 1 | CuO | 72 | | | | | |
| | Cu | | 115 | 126 | 127 | 132 | 136 |
| | ZnO | 137 | 142 | 147 | 145 | 169 | 167 |
| Example 1 | CuO | 106 | | | | | |
| | Cu | | 95 | 95 | 98 | 98 | 105 |
| | $ZnAl_2O_4$ | 28 | 29 | 31 | 29 | 31 | 31 |

The value is the mean particle diameter (angstrom) computed according to the Scherrer equation.

<Physical Change of Catalyst in XAFS>

Figure 2:
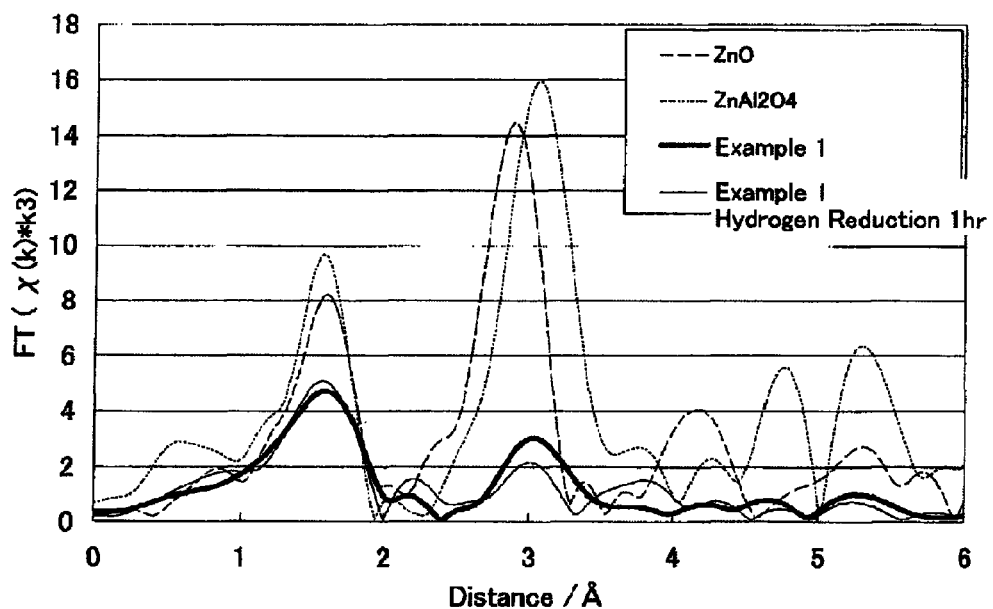
FIG. 2 It is a Zn—K XAFS analytical result of the catalyst of Example 1 of the present invention.

The catalyst of Example 1 and Comparative Example 1 was analyzed through XAFS. A sample of zincite and $ZnAl_2O_4$ was also analyzed through XAFS, and the data thereof were compared with those of Example 1 and Comparative Example 1. FIG. 2 shows the data of Zn—K XAFS analysis of the catalyst of Example 1; and FIG. 3 shows the data of Zn—K XAFS analysis of the catalyst of Comparative Example 1.

As in FIG. 2, the peaks of the catalyst of Example correspond to those of $ZnAl_2O_4$ but not to those of zincite.

Figure 3:
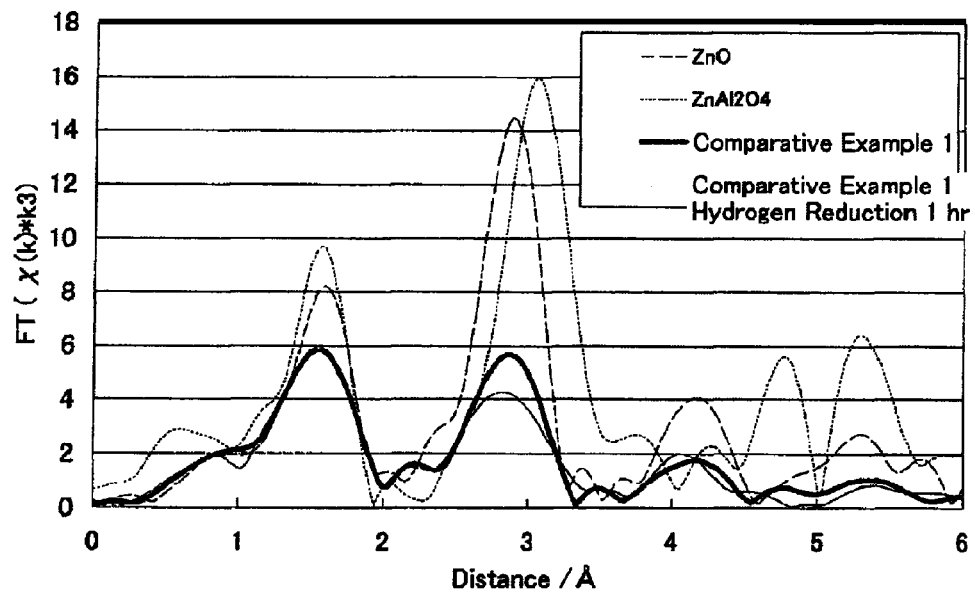
FIG. 3 It is a Zn—K XAFS analytical result of the catalyst of Comparative Example 1.

As in FIG. 3, the peaks of the catalyst of Comparative Example correspond to those of zincite but not to those of $ZnAl_2O_4$.

Accordingly, this brings about the following conclusion.

In the catalyst of Example, the zinc ingredient exists as $ZnAl_2O_4$, and zincite does not exist therein.

In the catalyst of Comparative Example, the zinc ingredient exists as zincite, and $ZnAl_2O_4$ does not exist therein.

The invention claimed is:

1. A catalyst for carbon monoxide conversion, comprising from 10 to 90% by mass of a copper oxide ingredient, from 5 to 50% by mass of a zinc oxide ingredient and from 10 to 50% by mass of an aluminum oxide ingredient, and having a specific surface area of from 100 to 300 $m^2/g$, a carbon monoxide adsorption of from 20 to 80 μmol/g, and a copper oxide crystallite diameter of at most 200 angstroms.

2. The catalyst for carbon monoxide conversion as claimed in claim 1, wherein the copper oxide ingredient accounts for from 30 to 80% by mass, the zinc oxide ingredient accounts for from 5 to 40% by mass, and the aluminum oxide ingredient accounts for from 15 to 40% by mass.

3. The catalyst for carbon monoxide conversion as claimed in claim 1, wherein the zinc oxide ingredient is derived from at least the zinc atom and the oxygen atom of $ZnAl_2O_4$.

4. The catalyst for carbon monoxide conversion as claimed in claim 1, wherein the zinc oxide ingredient does not contain zincite.

5. The catalyst for carbon monoxide conversion as claimed in claim 1, wherein the atomic ratio of copper/zinc is at least 1.0, and the atomic ratio of zinc to aluminum (Zn/Al) is from 0.1 to 1.5.

6. The catalyst for carbon monoxide conversion as claimed claim 1, wherein the copper oxide crystallite diameter is at most 150 angstroms.

7. The catalyst for carbon monoxide conversion as claimed in claim 1, wherein the zinc-aluminum spinel crystallite diameter is at most 100 angstroms.

8. The catalyst for carbon monoxide conversion as claimed in claim 1, which has a specific surface area of from 120 to 200 $m^2/g$.

9. The catalyst for carbon monoxide conversion as claimed in claim 1, which has a carbon monoxide adsorption of from 30 to 70 μmol/g.

10. The catalyst for carbon monoxide conversion as claimed in claim 1, which is produced by washing, drying and calcining a precipitate formed by mixing a solution that contains a copper salt, a zinc salt and an aluminum salt and a solution that contains sodium hydroxide.

11. The catalyst for carbon monoxide conversion as claimed in claim 10, wherein the pH of the mixture of the solution containing a copper salt, a zinc salt and an aluminum salt and the solution containing sodium hydroxide is from 7 to 11.5.

12. The catalyst for carbon monoxide conversion as claimed in claim 10, wherein the pH of the mixture of the solution containing a copper salt, a zinc salt and an aluminum salt and the solution containing sodium hydroxide is from 8.5 to 11.0.

* * * * *